United States Patent [19]

Fujimoto et al.

[11] 4,037,230

[45] July 19, 1977

[54] TIMING CIRCUIT FOR INK JET SYSTEM PRINTER

[75] Inventors: Isao Fujimoto, Kunitachi; Takeshi Kasubuchi; Masahiko Aiba, both of Nara, all of Japan

[73] Assignees: Nippon Telegraph and Telephone Public Corporation, Tokyo; Sharp Kabushiki Kaisha, Osaka, both of Japan

[21] Appl. No.: 641,996

[22] Filed: Dec. 18, 1975

Related U.S. Application Data

[63] Continuation-in-part of Ser. No. 450,415, March 12, 1974, abandoned.

[30] Foreign Application Priority Data

Mar. 12, 1973 Japan .............................. 48-28687

[51] Int. Cl.² ............................................. G01D 15/24
[52] U.S. Cl. .................................. 346/75; 346/139 R
[58] Field of Search .............. 346/75, 139 R; 197/1 R

[56] References Cited

U.S. PATENT DOCUMENTS

| 3,555,558 | 1/1971 | Sherman | 346/75 |
| 3,858,702 | 1/1975 | Azuma | 197/1 R |
| 3,878,517 | 4/1975 | Kasubuchi et al. | 346/75 |
| 3,925,787 | 12/1975 | Suzuki | 346/75 |

Primary Examiner—Joseph W. Hartary
Attorney, Agent, or Firm—Birch, Stewart, Kolasch & Birch

[57] ABSTRACT

In an ink jet system printer of the charge amplitude controlling type, wherein a printing head is transported in a horizontal direction and vertical deflection is achieved by a pair of high voltage deflection plates, it is required to transport the printing head at a fixed velocity in the printing process. More particularly, in order to execute intermittent printing by repetition of the transporting and stopping of the printing head in response to intermittent input signals, it is necessary that printing is restricted during the time required for increasing the velocity of the printing head to a desired level and then permitted after that time. The present invention provides a system wherein the generation of printing start signals is delayed by a predetermined period following the application of input signals, and also a system wherein printing start signals are generated when the actual velocity of the head has been sensed as reaching the desired velocity.

3 Claims, 8 Drawing Figures

TIMING CIRCUIT FOR INK JET SYSTEM PRINTER

This application is a continuation-in-part of application Ser. No. 450,415 filed: Mar. 12, 1974 now abandoned of Isao Fujimoto, Takeshi Kasubuchi and Masahiko Aiba for A TIMING CIRCUIT FOR INK JET SYSTEM PRINTER.

BACKGROUND AND SUMMARY OF THE INVENTION

The present invention relates to timing circuits for an intermittent operating ink jet system printer of the charge amplitude controlling type.

In conventional mechanical printers, a head is transported by one character space and stopped at that position upon completion of one character printing. Printing is again effected upon receipt of the next printing information from a key. Thus, the head is stopped during the printing operation and as a result, the velocity of movements of the head in no way influence printing accuracy.

In contrast with the foregoing, in the ink jet system printer of the charge amplitude controlling type, vertical deflection is achieved by a pair of high voltage deflection plates and horizontal deflection is achieved by transporting the head at a fixed velocity in the horizontal direction. It is, therefore, quite essential that the head is transported at a substantially constant velocity for the printing process. More specifically, in the intermittent operating ink jet system printer of the charge amplitude controlling type, which makes a record on a writing medium in accordance with input signals intermittently introduced, for example, by means of a keyboard, the head, which has an ink issuing nozzle must start travelling upon receipt of the input signals and stop upon completion of one-character printing. The reason for this is that the input signals are introduced with no synchronization with the various control signals for the printer apparatus. Variations in the velocity of the head movements result in a considerably reduced printing accuracy. Needless to say, it is impossible to speed the head up from a stationary state to the desired velocity in a moment.

An object of the present invention is to provide a timing circuit which is useful for an intermittent operating ink jet system printer of the charge amplitude controlling type.

Another object of the present invention is to provide a circuit construction wherein after receiving intermittent input signals, the generation of the printing start signals is delayed for a period of time until the velocity of the head has stabilized.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, although the head starts travelling in response to intermittently introduced print information, printing is not carried out until the velocity of the head becomes stable, that is, printing is inhibited while the head velocity is in the transient state, that is, where the head velocity is continually varying.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
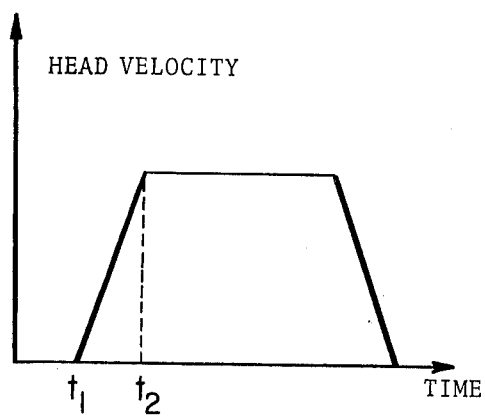
FIG. 1 is a time chart showing the variations in the velocity of movements of the head after receiving driving signals.

In FIG. 1, at time $t_1$, a head starts travelling upon the application of input signals from a keyboard, etc., and at time $t_2$, the velocity of the head reaches a predetermined value. Actually, printing is to start at time $t_2$ and thus any means used for suppressing the print operations from $t_1$ to $t_2$ is required. Variations in the velocity of the head from $t_1$ to $t_2$ are dependent upon characteristics of a head driver portion; the velocity varying constantly or randomly.

Figure 2:
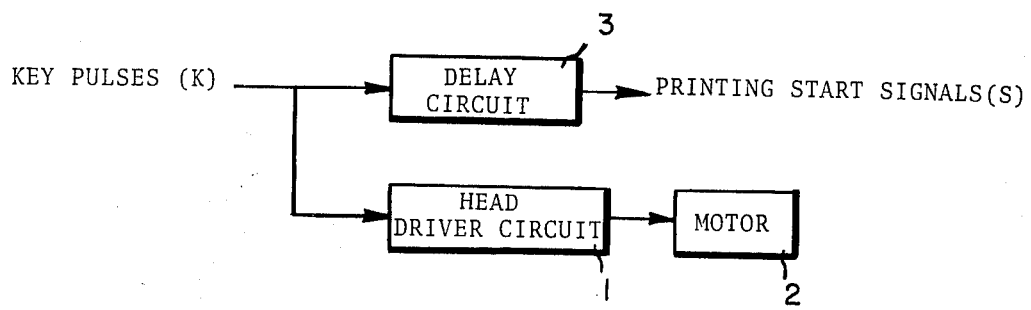
FIG. 2 is a simplified block diagram showing one embodiment of the present invention.

FIG. 2 illustrates an embodiment of the present invention which is used for an ink jet system printer wherein the head velocity increases at a fixed rate. When key pulses K are introduced from conventional input means such as keyboard into a head driver circuit 1, a motor 2 starts rotating and thus a head starts travelling. The key pulses K are also entered into a delay circuit 3 and after a lapse of a predetermined period, corresponding to the time from $t_1$ to $t_2$, printing start signals S are generated. At the time of the generation of the printing start signals S, the velocity of the head has already reached a fixed velocity.

Figure 3:
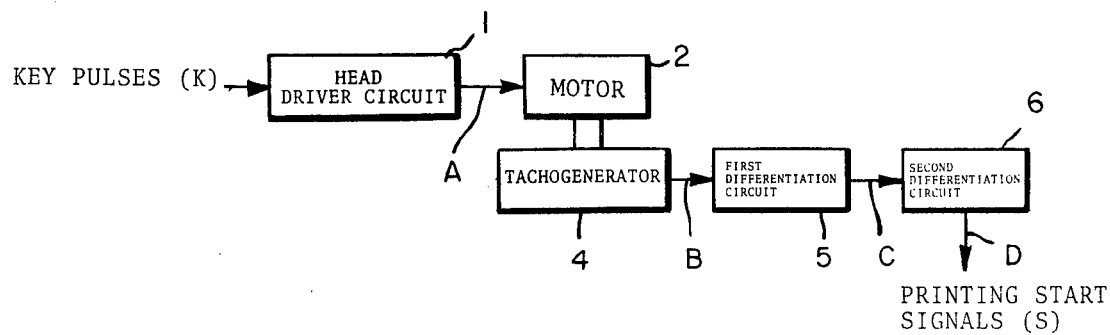
FIG. 3 is a simplified block diagram showing another embodiment of the present invention.
Figure 4:
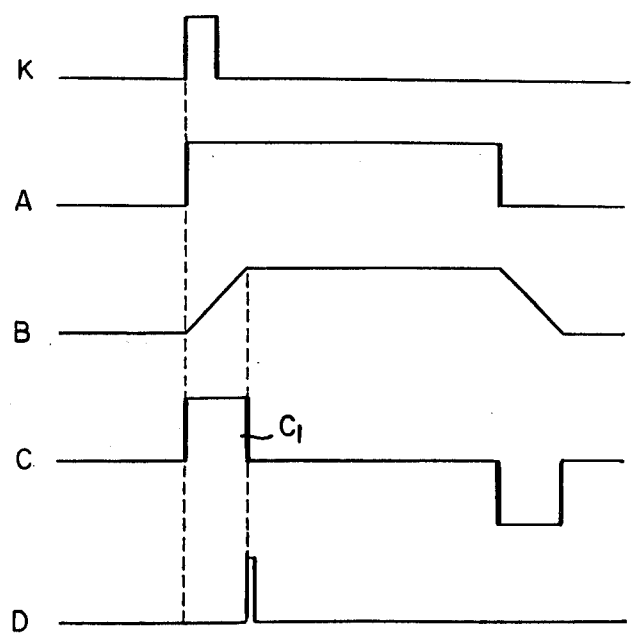
FIG. 4 is a time chart showing the operations of the circuit of FIG. 3.

FIGS. 3 and 4 illustrate another embodiment of the present invention which is used for an ink jet system printer wherein the velocity of the head varies at random. Similarly, the key pulses K are introduced into the head driver circuit 1 and the motor 2 receives the head driving signals A. The motor 2 starts rotating upon receiving the key signals K and the head also starts travelling at the same time. A tachogenerator 4 is physically coupled with the motor 2 to create detection voltage B in proportion to the velocity of the head. As an alternative, a resistor bridge (not shown) can be employed and in this instance the motor 2 is positioned at a side of the resistor bridge to obtain the detection voltage B.

The detection voltage B is applied to a first differentiation circuit 5 to obtain first differentiation signals C, which in turn are applied to a second differentiation circuit 6. The second differentiation circuit 6 forms a second differentiation signal D at the trailing edge of the positive pulse C of the first differentiation signals C. The second differentiation signals D serve as the printing start signals S. At the time of the generation of the printing start signals S the head has already begun a constant and stable travel.

Figure 6:
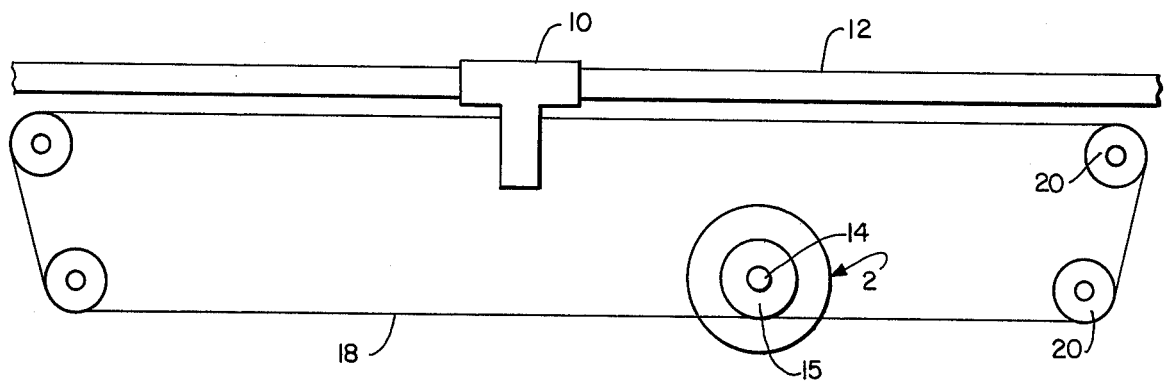
FIG. 6 is a schematic of a head drive mechanism of the present invention.

The printing head 10 of the present invention is schematically shown in FIG. 6 as being mounted for translation back and forth longitudinally of a head mounting shaft 12 under control of the drive motor 2. The printing head 10 is driven by a drive wire or cable 18 which is reeved about idler pulleys 20 and driven by a drive pulley 16 which is mounted on the shaft 14 of the drive motor 2 for rotation therewith.

Figure 5:
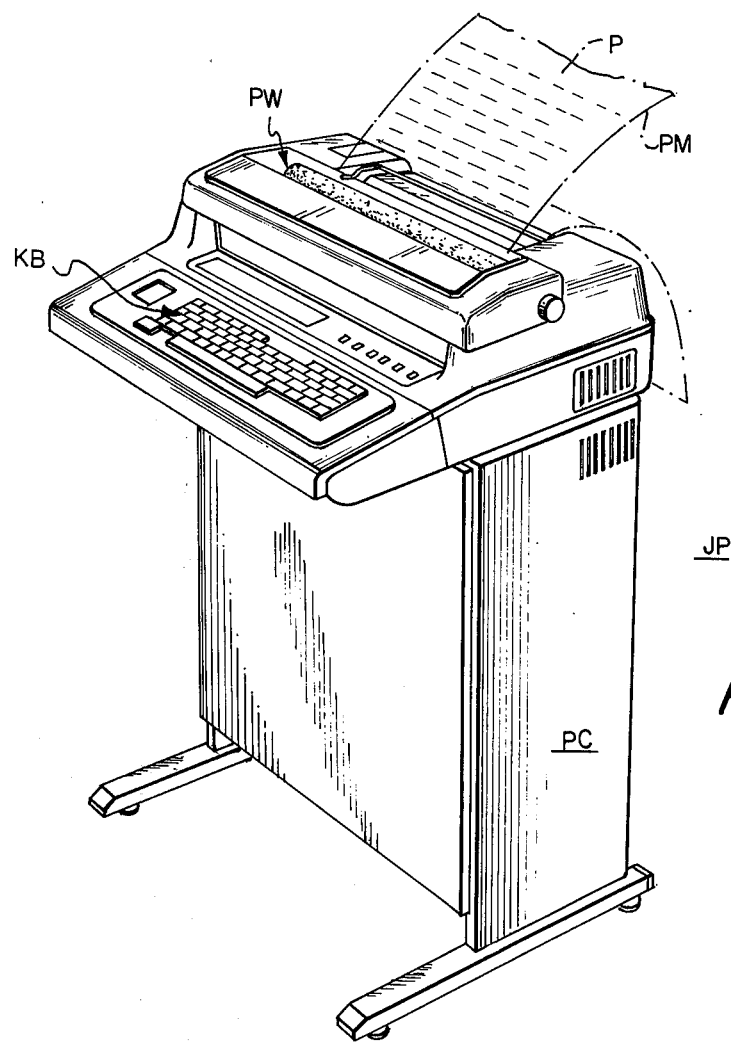
FIG. 5 is a perspective of an embodiment of an ink jet system printer of the present invention including a keyboard unit.

An ink jet printer JP of the present invention is shown in FIG. 5 as including a keyboard KB on a typewriter-like console PC. The printing head and drive means for same are located in a printing well PW in the printer JP. The printing P appears on a printing medium PM as generally illustrated.

Figure 7:
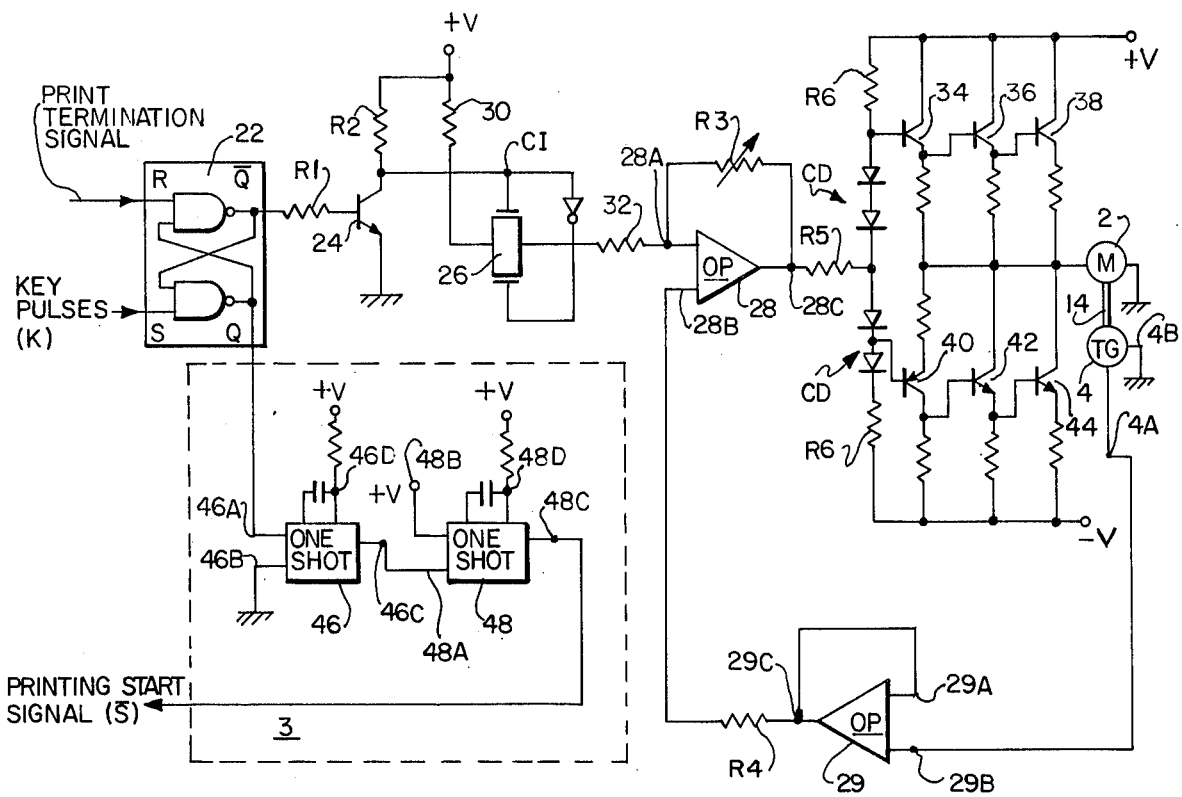
FIG. 7 is a more detailed schematic of the circuit of FIG. 2.

Reference is now made to FIG. 7 in which more detailed schematic of the previously described embodiment of FIG. 2 is illustrated as follows:

Keyboard KB (FIG. 5) emits key pulses K which are introduced into the set terminal S of an R-S flip-flop 22, the latter including a reset terminal R and output terminals Q and $\overline{Q}$.

The output terminal $\overline{Q}$ of the flip-flop 22 drives the base of a control transistor 24 through a coupling resistor R1. The control transistor 24 is connected at its collector terminal to the control input CI of an analogue switch 26. Since the transistor 24 is normally ON, the control input CI of the analogue switch is grounded through the collector emitter path of the transistor 24 and the said analogue switch 26 is normally OFF.

The collector of the control transistor 24 and the control input CI of the analogue switch 26 are both connected through a resistor R2 to a source of positive bias +V.

When the analogue switch 26 is ON, a predetermined value of velocity instruction current flows from the positive bias +V through resistor 30, analogue switch 26 and resistor 32 into a first input terminal 28A of an operational amplifier 28. The output 28C is fed back to the first input 28A via a variable resistor R3.

The other input terminal 28B of the operational amplifier 28 is driven via a resistor R4 by the output 29C of an operational amplifier 28 is driven via a resistor R4 by the output 29C of an operational amplifier 29 having a first input 29A direct coupled to its output 29C and a second input 29B direct coupled to the output terminal 4A of a tachogenerator 4 driven by the shaft 14 of the print head drive motor 2. The tachogenerator 4 is provided with a grounded reference terminal 4B.

The drive motor 2 is driven from the source of positive bias (+V) and negative bias (−V) under the control of the output 20C of the operational amplifier 28 via a resistor R5 and control diodes CD and biasing resistors R6 which control the base bias of input transistors 34 and 40 in a power amplifier arrangement of transistors 34-36-38 and 40-42-44 which drive the motor 2 at its power terminal 2A, the other side 2B of the motor 2 being referenced to ground.

Back at the input side of the circuit of FIG. 7, the reset terminal R of the R-S flip-flop 22 receives a print termination signal which is conventionally generated upon completion of a word of printing or upon completion of the video signal for an ink droplet raster of thirty-five droplets normally constituting the printing of one character.

The other output Q of the R-S flip-flop 22 is connected to an input terminal 46A of a first one-shot switch 46 having its other input 46B connected to ground, a bias connection 46D to the source of positive bias +V and an output terminal 46C.

The output terminal 46C of the first one-shot switch 46 drives a first input terminal 48A of a second one-shot switch 48, the latter having a second input 48B connected to the source of positive bias +V, a bias connection 48D to the positive bias +V and an output 48C on which appears, at the proper time, a printing start signal $\overline{S}$ as will be hereinaftermore fully described.

The one shots 46 and 48 comprise the delay circuit 3 of FIG. 2 as shown in dotted lines in FIG. 7.

In operation of the embodiment of FIGS. 2 and 7 the key pulses K are introduced into the set terminal S of the R-S flip-flop 22. The R-S flip-flop 22 thus assumes its set condition upon depression of any one of the key switches provided on the keyboard unit KB (FIG. 5) and, therefore, the Q output of the flip-flop 22 assumes its low level. This causes the control transistor 24 to turn OFF and place the control input CI of the analogue switch 26 at its high level and, therefore, drive the analogue switch 26 ON. Under these conditions the velocity instruction current of a predetermined value is supplied to the input terminal 28A of the operational amplifier 28 via the resistors 30 and 32 and the analogue switch 26. The input terminal 28B of the operational amplifier 28 meanwhile will receive the output signal of the tachogenerator 4 from its output 4A. The operational amplifier 28 thus provides an amplified signal at its output terminal 28C in accordance with difference of the two input signals at the terminals 28A and 28B. The output signal from the operational amplifier 28 is power amplified by transistors 34, 36, 38, 40, 42 and 44 and then applied to the drive motor 2. Therefore, the motor 2 rotates at a fixed velocity corresponding to the velocity instruction current after a lapse of a predetermined time period following the introduction of the key pulses K, namely, the time T required to accelerate it up to speed as determined by the said velocity instruction current.

Further, when the R-S flip-flop 22 assumes its set condition and the drive motor 2 begins to rotate, the Q output of the R-S flip flop 22 assumes its high level, whereby the first one-shot switch 46 is triggered to count a predetermined time period T. After the lapse of the predetermined time period T, the second one-shot switch 48 is triggered to develop the printing start signals S, which will be applied to a video generator of a conventional construction.

Figure 8:
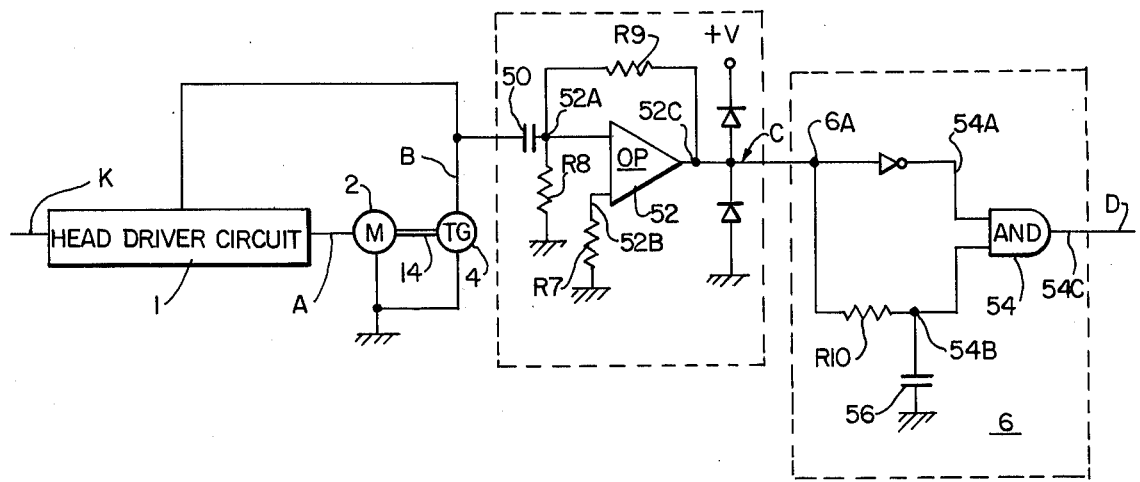
FIG. 8 is a more detailed schematic of the circuit of FIG. 3.

Referring now to FIG. 8 in further explanation of the embodiment of FIGS. 3 and 4, the head driver circuit 1 although generally shown, comprises circuit of FIG. 7 with the one-shot switches 46 and 48 omitted.

Thus, the tachometer generator 4 has an output signal B, previously described with reference to FIGS. 3 and 4, which is applied through a coupling capacity 50 to the first differential amplifier circuit 5, the latter comprising: an operational amplifier 52 having a first input terminal 52A driven by the tachogenerator signal B via the capacitor 50; a second input terminal 52B connected to ground through a resistor R7; a resistor R8 connected from the first input terminal 52 to ground; an output terminal 52C connected via a resistor R9 to the first input terminal 52A and connected to the source of positive bias +V and ground between a pair of clamping diodes CD1, CD2 to present the output signal C thereof to the second differentiation circuit 6.

The second differentiation circuit 6 comprises: are input terminal 6A; an inverter connecting the input terminal 6A to one terminal 54A of an AND gate 54; a resistor R10 connecting the input terminal 6A to the other input 54B of the AND gate 54; a timing capacitor 56 connecting the said second input terminal 54B of the AND gate 54 to ground; and an output terminal 54C of the AND gate 54 which carries the output signal D of the second differentiation circuit 6, said signal previously having been disclosed with reference to FIGS. 3 and 4.

In operation, the embodiment of FIGS. 3, 4 and 8 takes the tachogenerator signal B and feeds it back to the head driver circuit 1 (see the operational amplifier 29 of FIG. 7) and also applies it to the first differentiation circuit 5 which provides an output C and precludes the operation of AND gate 54 to provide a signal D until the speed of the motor 2 and hence, the tachogenerator output signal B, is constant.

As previously shown in and described reference to FIGS. 3 and 4, the output signal D of the second differentiation circuit 6 corresponds to the printing start signals (S).

Ink jet system printers of the charge amplitude controlling type are shown in U.S. Pat. Nos. 3,136,594 to E. Ascoli, issued June 9, 1964; 3,298,030 to A.M. Lewis et al, issued Jan. 10, 1967; 3,555,558 to D.M. Sherman, issued Jan. 12, 1971; and 3,656,169 to T. Kashio, issued Apr. 11, 1972.

In ink jet system printers of the charge amplitude controlling type it is a known expedient in the art to apply printing start signals, such as the signals S, to the printing information information generating system of the printer, preferably, to the video generator of the printer. For example, in U.S. Pat. No. 3,555,558 previously identified herein, see FIG. 4, start data is applied from data synchronizer circuits 98 to the video signal generator 102 and other start data correlated with the carriage return detector 88 is applied from the latter to a data source circuit 84. By way of further example, in U.S. Pat. No. 3,656,169, see FIG. 2 a character tracing (printing) start signal is transmitted from a switch 19 to a computer 13 via a lead 25; and U.S. Pat. No. 3,688,034, see FIG. 2 shows start STA and stop STP print signals applied to input terminals of a print signal generator 10-11-12-13-14.

Intermittent energization of print heads in ink jet printer systems by keyboards and the like is disclosed in U.S. Pat. No. 3,878,517 to Kasubuchi et al, issued Apr. 15, 1975, (commonly assigned to the present assignee) and entitled Ink Jet System of Charge Amplitude Controlling Type, based on application Ser. No. 366,044 filed June 1, 1973. In addition, common knowledge in the art of keyboard operated ink jet printers is exemplified in German Pat. No. 2,227,056 of Dec. 14, 1972.

The drive motor 2 in both embodiments can be a conventional printed rotor type motor which has very low inertia and is thus suitable for intermittent drive.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A print timing circuit for use in an ink jet system printer having a travelling printing head intermittently driven by a rotary motor in correlated response to intermittently applied input signals comprising: means for detecting the rotational velocity of the motor driving the said printing head of the ink jet system printer subsequent to the occurrence of each said intermittent input signal and means responsive to said detecting means for generating printing start signals for each of said intermittent input signals only when the rotational velocity of said motor and the resulting velocity of the printing head reaches a constant value.

2. A print timing circuit for an ink jet system printer comprising head driving means for controlling a motor for intermittently driving a printing head of the ink jet system printer in correlated response to intermittently introduced input signals, means for detecting the rotational velocity of said motor as a measure of the velocity of the printing head and providing a first output signal representative of the said rotational velocity, means for determining from the said first output signal of the said detecting means when the said rotational velocity and that of the head reach desired velocities and providing a second output signal when said desired velocities occur and means responsive to said second output signal for generating printing start signals based upon such determination.

3. The print timing circuit as set forth in claim 2, wherein the printing start signal generating means comprises a first differentiation circuit for differentiating the said first output signal from the said rotational velocity detecting means and a second differential circuit for differentiating the said second output signal of the first differentiation circuit and generating the printing start signals of pulse shape.

* * * * *